(12) United States Patent
Suzuki

(10) Patent No.: US 8,371,819 B2
(45) Date of Patent: Feb. 12, 2013

(54) QUIET PROPELLER

(75) Inventor: Masahiko Suzuki, Hamamatsu (JP)

(73) Assignee: Kabushiki Kaisha Bellsion (JP)

( * ) Notice: Subject to any disclaimer, the term of this patent is extended or adjusted under 35 U.S.C. 154(b) by 1201 days.

(21) Appl. No.: 12/092,114

(22) PCT Filed: Oct. 31, 2006

(86) PCT No.: PCT/JP2006/321695
§ 371 (c)(1),
(2), (4) Date: May 23, 2008

(87) PCT Pub. No.: WO2007/052626
PCT Pub. Date: May 10, 2007

(65) Prior Publication Data
US 2009/0226323 A1    Sep. 10, 2009

(30) Foreign Application Priority Data

Nov. 1, 2005 (JP) ................................. 2005-318126
Sep. 4, 2006 (JP) ................................. 2006-239197

(51) Int. Cl.
*B63H 1/00* (2006.01)

(52) U.S. Cl. ......................... 416/228; 416/235; 416/237

(58) Field of Classification Search .................. 416/23, 416/132 R, 202, 223 R, 227 A, 228, 231 A, 416/234, 235, 237, 238, 241 R, 243, DIG. 5; 366/313, 321, 325.1, 327.4, 330.1, 330.3, 366/337; 244/213, 214, 215
See application file for complete search history.

(56) References Cited

U.S. PATENT DOCUMENTS 411,802 A * 10/1889 Freed ............................ 416/237
(Continued)

FOREIGN PATENT DOCUMENTS

GB        511932 A        8/1939
JP      52042305 U   *   3/1977
(Continued)

OTHER PUBLICATIONS

Translation of JP52-42305.*
(Continued)

*Primary Examiner* — Igor Kershteyn
*Assistant Examiner* — Christopher R Legendre
(74) *Attorney, Agent, or Firm* — Ostrolenk Faber LLP

(57) ABSTRACT

Provided is a quiet propeller including a propeller blade having such a pitch angle not at its root portion but at its blade end edge portion with respect to a relative flow in the rotational direction, as to raise the internal pressure of a liquid thereby to eliminate a cavity, a water bubble or a cavitation at the blade root portion at the time of a high-speed rotation so that the propeller is rotated at a high speed by a small prime mover and by a prime mover capable of moving much fluid backward. In the quiet propeller, a propeller blade is curved backward at its leading end portion to form a slope portion, and a rotational front side end portion in the slope portion is formed into an arcuate shape in the side view whereas a rotational rear side end portion is so gradually extended backward from the rotational front side end portion as to become straight from the blade root to the blade end, thereby to form a deflecting slope face. At the rotating time, the fluid is pushed toward the back axis from the deflecting slope face in the slope portion.

6 Claims, 13 Drawing Sheets

U.S. PATENT DOCUMENTS

| | | | | |
|---|---|---|---|---|
| 833,586 A | * | 10/1906 | Crowther | 416/214 R |
| 1,255,346 A | * | 2/1918 | Sparks | 416/204 R |
| 1,838,453 A | * | 12/1931 | Rosen | 416/237 |
| 4,618,313 A | * | 10/1986 | Mosiewicz | 416/237 |
| 5,297,938 A | * | 3/1994 | Von Essen et al. | 416/237 |
| 2009/0226323 A1 | * | 9/2009 | Suzuki | 416/223 R |

FOREIGN PATENT DOCUMENTS

| | | |
|---|---|---|
| JP | 8-72794 A | 3/1996 |
| JP | 11-43096 A | 2/1999 |
| JP | 2003-11897 A | 1/2003 |
| JP | 2003-191889 A | 7/2003 |

OTHER PUBLICATIONS

International Search Report dated Feb. 6, 2007 issued in corresponding PCT Application No. PCT/JP2006/321695.

Microfilm of the specification and drawings annexed to the request of Japanese Utility Model Application No. 129067/1975 (Laid-open No. 42305-1977) (Sanyo Electric Co. Ltd.), Mar. 25, 1977, Figs. 4, 5.

* cited by examiner

QUIET PROPELLER

CROSS REFERENCE TO RELATED APPLICATIONS

The present application is a 35 U.S.C. §§371 national phase conversion of PCT/JP2006/321695, filed 31 Oct. 2006, which claims priority of Japanese Application No. 2005-318126, filed 1 Nov. 2005 and Japanese Application No. 2006-239197, filed 4 Sep. 2006. The PCT International Application was published in the Japanese language.

TECHNICAL FIELD

The present invention relates to a quiet propeller, and in particular to a quiet propeller comprising a plurality of propeller blades, the blade having an angle with respect to oncoming fluid flow to increase pressure into the center of the propeller during high speed rotation so as not to produce voids, bubbles or cavitation, thereby allowing high-speed rotation with a small motor and pushing back a lot of fluid.

BACKGROUND OF THE INVENTION

In a conventional screw propeller for underwater thrust, a blade is tilted with respect to a main shaft at the part close to the center of the propeller and the blade twists from the center to the periphery.

JP8-72794A discloses a high-speed thrust machine in which a blade tilts rearward.

In a conventional screw propeller for ships, an angle with respect to oncoming fluid flow is large at parts close to the center of the propeller, so that the propeller is thick and water flow twists with rotation of the propeller.

When rotational speed increases, water flow does not circulate along the angle with respect to oncoming fluid flow. Fluid leaves the blade surface to produce cavitation to cause noises and bubbles.

Twisting of water flow and cavitation cause loss in rotational energy.

SUMMARY OF THE INVENTION

It is an object of the present invention to provide a quiet propeller in which the central part of the propeller is not twisted, and an angle with respect to oncoming fluid flow is formed at a peripheral part of the blade to increase internal pressure, the propeller rotating faster without cavitation or noise, the propeller being usable for an air-conditioning fan, a ventilating fan, a pump and a windmill.

BEST MODE FOR CARRYING OUT THE INVENTION

Embodiment 1

Figure 1:
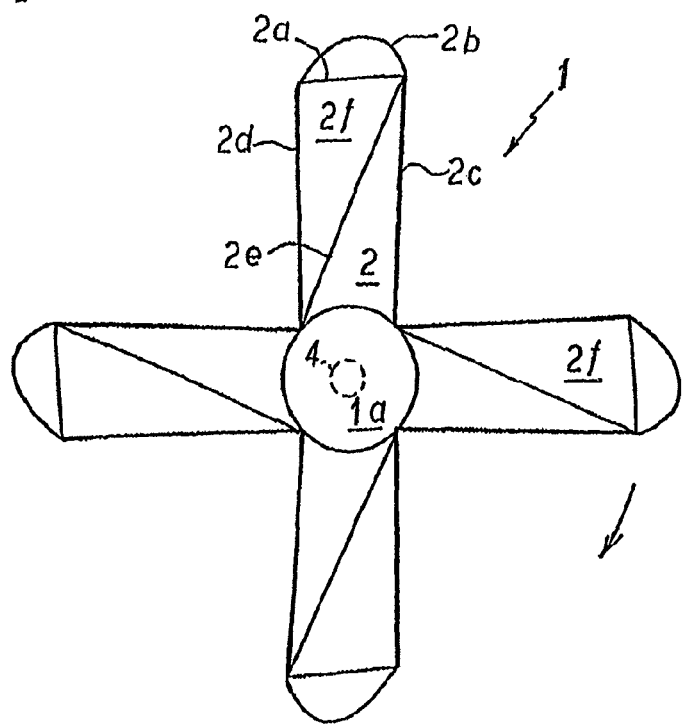
FIG. 1 is a rear elevational view of the first embodiment of a quiet propeller according to the present invention.
Figure 2:
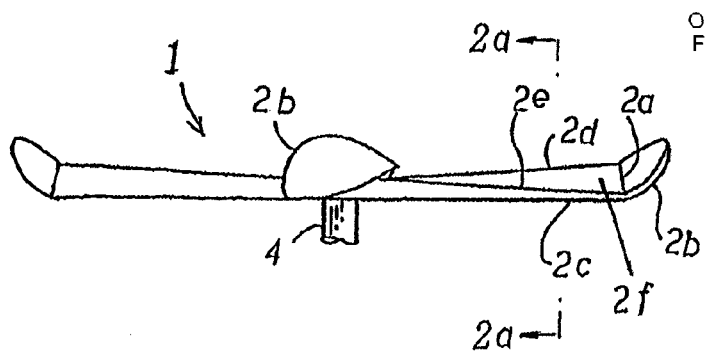
FIG. 2 is a top plan view thereof.
Figure 2A:
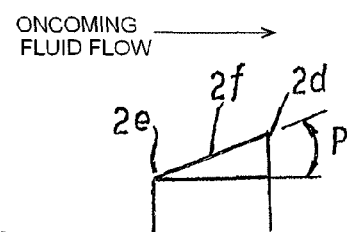
FIG. 2a is a sectional view taken along the line 2a-2a in FIG. 2.

Embodiments of the invention will be described. FIG. 1 is a rear elevational view of a quiet propeller according to the present invention, and FIG. 2 is a top plan view. The propeller 1 comprises four propeller blades 2 equally spaced around a boss 1a around a propeller shaft 4. The number of the propeller blades 2 is not limited to four.

The propeller blades 2 are substantially equal to each other in length from the base to the end. Between a leading edge 2c and a trailing edge 2d, there is a bend line 2a.

From the bend line 2a, a tilted end portion 2b which tapers is formed.

The tilted end portion 2b is tilted from the bend line 2a.

An angle of the tilted end portion 2b is variable from 15 to 45 degrees depending on the length of the blade 2b.

In FIG. 2, the length of tilted end portion 2b is 15% of the blade length, but may range between 15-60%.

In FIG. 1, from the outer end of the leading edge 2c of the blade 2 to the inner end of the trailing edge 2d, a diagonal line 2e extends.

From the diagonal line 2e, a tilted back surface 2f rises toward the trailing edge 2d having an angle of the back surface 2f with respect to oncoming fluid flow. The diagonal line 2e in FIG. 1 is straight, but may be curved.

In FIG. 2 in which the propeller blade 2 is seen horizontally, the leading edge 2c becomes thinner gradually from the center to the distal end of the blade 2.

In the tilted back surface 2f, an angle P with respect to oncoming fluid flow ranges from 7 to 25 degrees.

There is no angle with respect to oncoming fluid flow on the rear surface of the blade 2 close to the center of the propeller 1. The surface tilts up from the diagonal line 2e to form the tilted back surface 2f at the angle P with respect to oncoming fluid flow.

If required, the angle P with respect to oncoming fluid flow on the rear surface of the blade 2 close to the boss 1a may be 0 to four degrees.

To propel a ship, when the propeller 1 turns clockwise in FIG. 1, water flow is prohibited by the tilted end 2b from diffusing centrifugally, but pushed rearward by the tilted end portion 2b and the tilted back surface 2f.

In a conventional screw propeller, there is a greater angle with respect to oncoming fluid flow of the blade close to the boss 1a so that water flows along the surface of the blade at a low speed of rotation. However, water leaves the surface at a high speed of rotation to produce voids which decreases internal pressure to cause bubbles and noises. The propeller 1 in this invention does not cause such phenomena.

With rotation of the propeller 1 around the shaft 4, the blade 2 at the boss 1a does not have an angle with respect to oncoming fluid flow. Thus, at high speed rotation, fluid is pushed toward the center, so that internal pressure increases. Cavitation-producing voids, vortexes and bubbles are not caused, thus allowing quiet rotation without noise.

The angle P with respect to oncoming fluid flow of the peripheral end of the blade reduces water resistance during rotation, increasing rotational speed of the propeller 1. High speed rotation increases rotational speed of the periphery of the blade 2 to push more water to increase thrust. In this invention, the blades 2 have nearly equal and narrow width. There is no angle with respect to oncoming fluid flow close to the boss of the propeller and the angle P with respect to oncoming fluid flow is gentle closer to the periphery of the propeller 1.

The shape of the propeller 1 causes neither vortex nor cavitation. The blade 2 is narrow and an angle with respect to oncoming fluid flow at the periphery is gentle thereby reducing resistance during rotation to enable high speed rotation. The tilted end 2b prevents water flow from diffusing to gather water flow toward the center of the back surface to realize efficient thrust.

The propeller can be used as a blowing fan for an air conditioner or a ventilator. A small motor enables the propeller to turn at high speed without noise.

Embodiment 2

Figure 3:
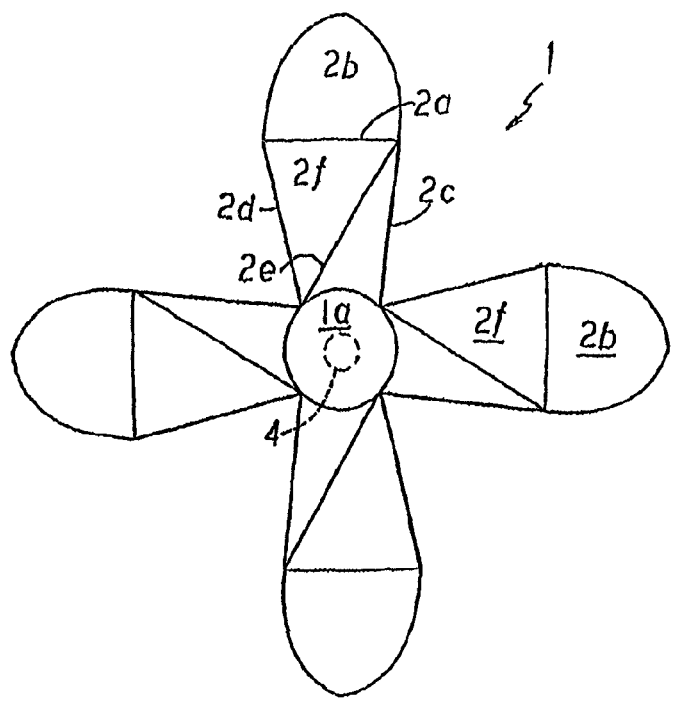
FIG. 3 is a rear elevational view of the second embodiment of a quiet propeller according to the present invention.
Figure 4:
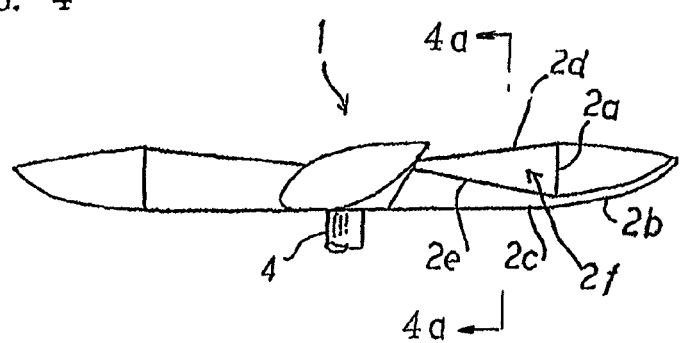
FIG. 4 is a top plan view thereof.
Figure 4A:
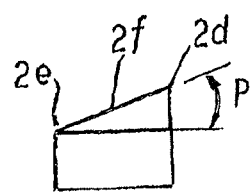
FIG. 4a is a sectional view taken along the line 4a-4a in FIG. 4.

FIG. 3 is a rear elevational view of the second embodiment of a propeller according to the present invention, and FIG. 4 is a top plan view thereof.

The propeller includes a boss 1a which rotates around the shaft 4. In the second embodiment, a bend line 2a of a propeller blade 2 is set to be positioned at 40% of a radius of the propeller 1 from the peripheral end. A tilted end portion 2b has a length of 40% of that of the blade 2 or radius of the propeller, but it is not limited thereto.

A tilted back surface 2f and the tilted portion 2b having an angle P with respect to oncoming fluid flow are broader than those in the first embodiment to increase the amount of water moved by propeller blade 2. The length of the tilted end portion 2b is set to be 15-60% of the length of the blade 2. If the tilted end portion 2b is longer, a tilting angle of the tilted end portion 2b may be smaller.

Embodiment 3

Figure 5:
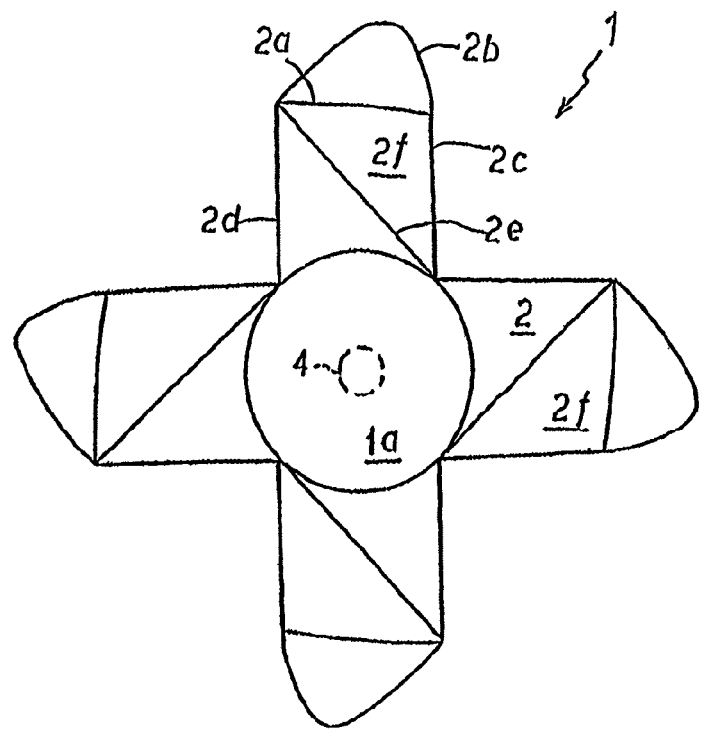
FIG. 5 is a rear elevational view of the third embodiment of a quiet propeller according to the present invention.
Figure 6:
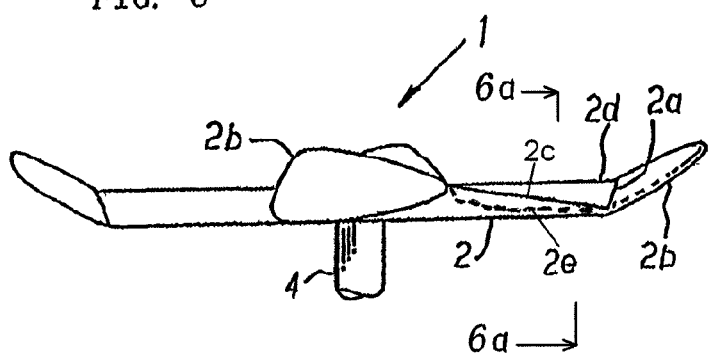
FIG. 6 is a top plan view thereof.
Figure 6A:
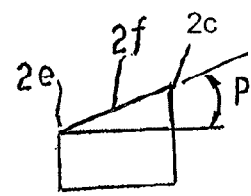
FIG. 6a is a sectional view taken along the line 6a-6a in FIG. 6.

FIG. 5 is a rear elevational view of the third embodiment of a propeller and FIG. 6 is a top plan view. The same numerals are allotted to the same members as those in the former embodiments, and description thereof is omitted.

In the third embodiment in FIG. 5, the distal end of a trailing edge 2d of a propeller blade 2 contacts a bend line 2a. A diagonal line 2e extends from the connecting point to the proximal end of a leading edge 2c.

In FIG. 6, the leading edge 2c becomes thinner from the boss 1a around the propeller shaft 4 to the periphery of the propeller 1. With respect to the diagonal line 2e, the propeller blade 2 tilts forward to form an angle P with respect to oncoming fluid flow. In FIG. 6, the angle P with respect to oncoming fluid flow ranges from 7 to 25 degrees.

In the third embodiment, an angle with respect to oncoming fluid flow is not formed close to the center of the propeller 1. Thus, during high speed rotation, there is neither void nor vortex so that bubbles, noise or cavitation does not occur.

At the boss 1a of the propeller 1, the part of the blade 2 behind the diagonal line 2e is broader, providing high rigidity. Therefore, the blade 2 can be made thinner to decrease resistance during rotation.

With rotation of the blade 2, the blade 2 pushes back water close to the bend line 2a using a tilted back surface 2f having an angle P with respect to oncoming fluid flow, so that the reaction force caused by blade 2 exerts thrust on a ship.

During rotation, water does not diffuse centrifugally from the blade 2, but is pushed back to cause the ship to go forward by the reaction force caused by blade 2.

At the same time, with water flowing through the blades 2, the blade 2 turns naturally, thereby reducing the driving force of a motor. This is because the blade 2 turns by a force exerted on the front of the blade 2 in the same manner as a propeller blade rotates in a wind.

In a conventional screw propeller, water twists and travels rearward of the screw propeller. The force of the twisting water is excessive and causes loss in power. Water which flows from the front of the screw propeller does not flow smoothly through the propeller because the water twists as it travels rearward, resulting in bubbles and cavitation.

In contrast, the propeller blade 2 according to the present invention has no angle with respect to oncoming fluid flow close to the boss of the propeller. Thus, water flowing through the propeller blade 2 does not twist, which reduces water resistance during the rotation of the blade 2. The gentle angle with respect to oncoming fluid flow of the blade 2 close to the periphery makes water flowing through the blade 2 unlikely to twist, but provides smoother flow to decrease noise and bubbles with less power loss.

The propeller 1 according to the present invention rotates faster than conventional screw propellers. A motor with less driving power can be used.

With the maximum length bend line 2a, the angles P with respect to oncoming fluid flow of the tilted back surface 2f and tilted end portion 2b improve fluid-transferring efficiency.

At the same time, water which flows along the front surface of the blade 2 to the rear surface flows rearward with negative pressure on the front surface of the blade 2. Water on the rear surface of the blade 2 is pressed by the tilted back surface 2f repeatedly.

Water which flows through the blade 2 smoothly and strongly speeds up the rotation of the propeller 1.

The propeller 1, which is small in size but produces a higher thrust, is suitable for ships. It is also used as a steering wheel for ships.

By changing its radius, the blade 2 may be employed in a fan for an air conditioner and a ventilator.

The propeller 1 produces a thrust by water or wind which flows across the blades. For blowing wind, the blade 2 may be made thinner to produce decreased noise at higher wind speeds.

A motor for driving the propeller can be made smaller and the propeller can be used widely as a fan of an air conditioner, or a ventilating fan in a tunnel or pump.

Figure 7:
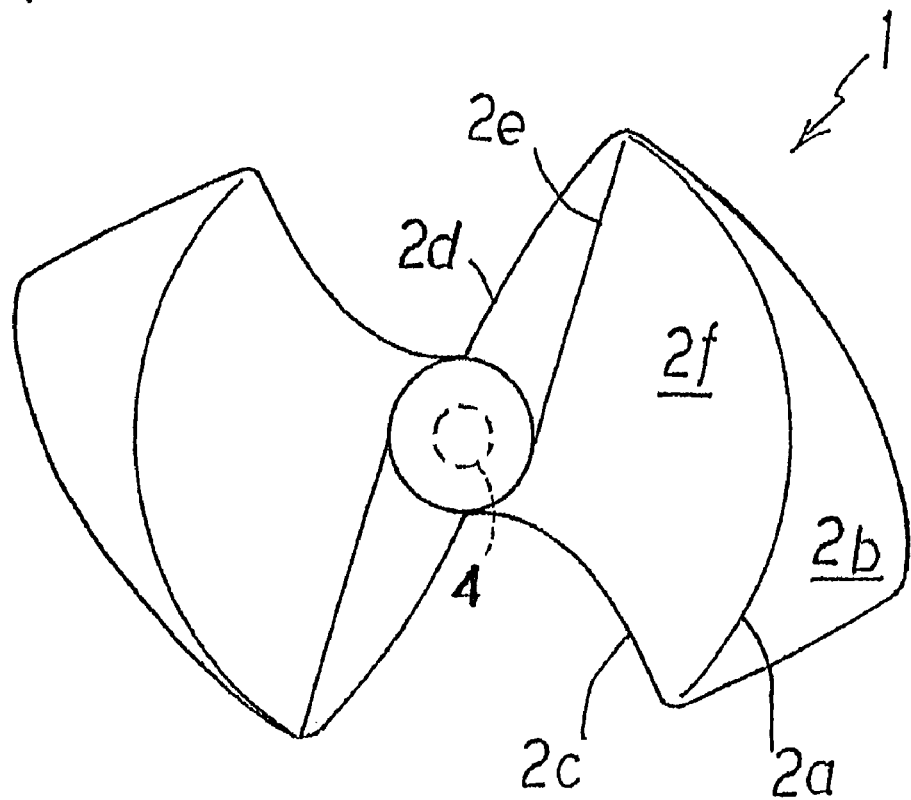
FIG. 7 is a rear elevational view of the fourth embodiment of a quiet propeller according to the present invention.
Figure 8:
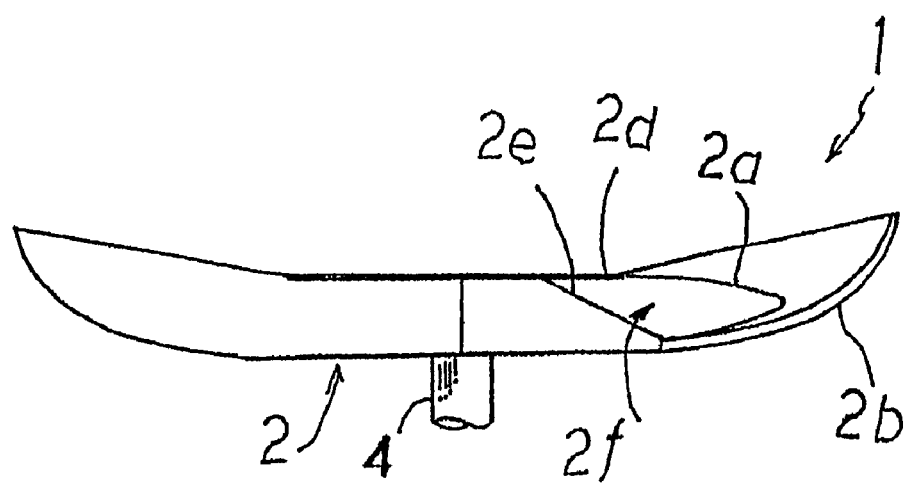
FIG. 8 is a top plan view thereof.

FIG. 7 is a rear elevational view of the fourth embodiment of a propeller according to the present invention, and FIG. 8 is a top plan view thereof. The same numerals are allotted to the same members and description thereof is omitted. The propeller 1 rotates around the shaft 4.

In the fourth embodiment, a leading edge 2c of a propeller blade 2 is provided with respect to a trailing edge 2d at a greater angle therebetween.

Therefore, a tilted back surface 2f has a greater area. In FIG. 8, an angle of the tilted back surface 2f with respect to oncoming fluid flow is gentle, for example, 15 degrees, since the surface 2f is longer along a turning direction of the blade 2.

A bend line 2a is a curve and a tilted end portion 2b is gently tilted from the bend line 2. The tilted end portion 2b has an angle with respect to oncoming fluid flow since the side edge highly tilts.

Thus, when the propeller 1 rotates, the surfaces of the tilted back surface 2f and the tilted end portion 2b with an angle with respect to oncoming fluid flow exert forces on the water flow. The areas with an angle with respect to oncoming fluid flow are located away from the propeller shaft 4 to increase their thrust.

Figure 9:
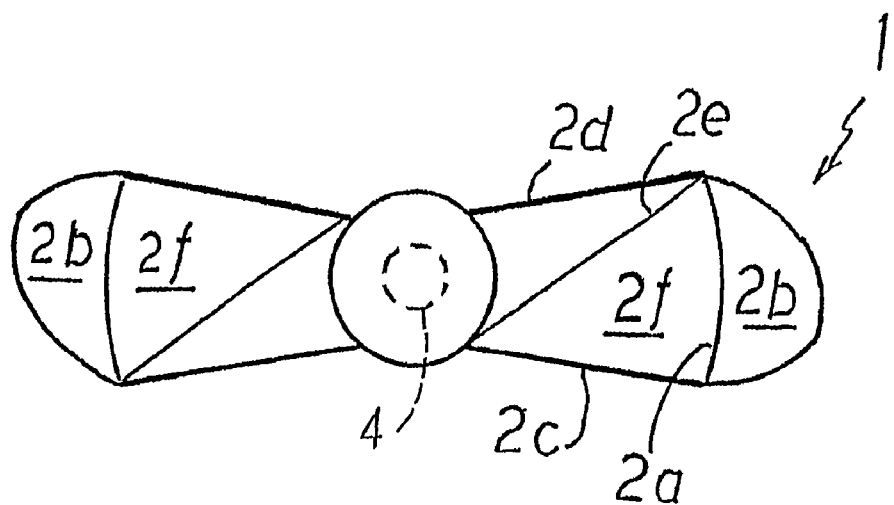
FIG. 9 is a rear elevational view of the fifth embodiment of a quiet propeller according to the present invention.
Figure 10:
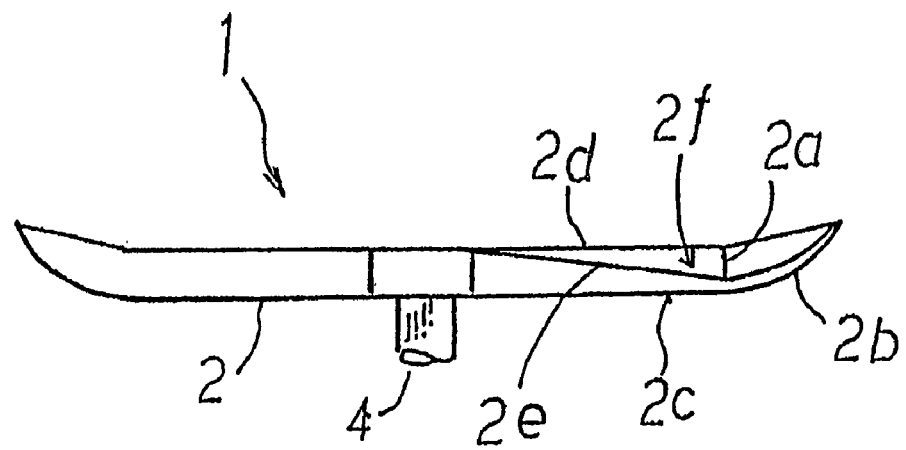
FIG. 10 is a top plan view thereof.

FIG. 9 is a rear elevational view of the fifth embodiment of a propeller according to the present invention. FIG. 10 is a top plan view thereof. The same numerals are allotted to the same members and description thereof is omitted. The propeller 1 rotates around the shaft 4

A tip of a blade in the fifth embodiment is narrower than that in the fourth embodiment. The blade is thinner and relatively flat thereby speeding up the rotation compared with the former embodiments.

Figure 11:
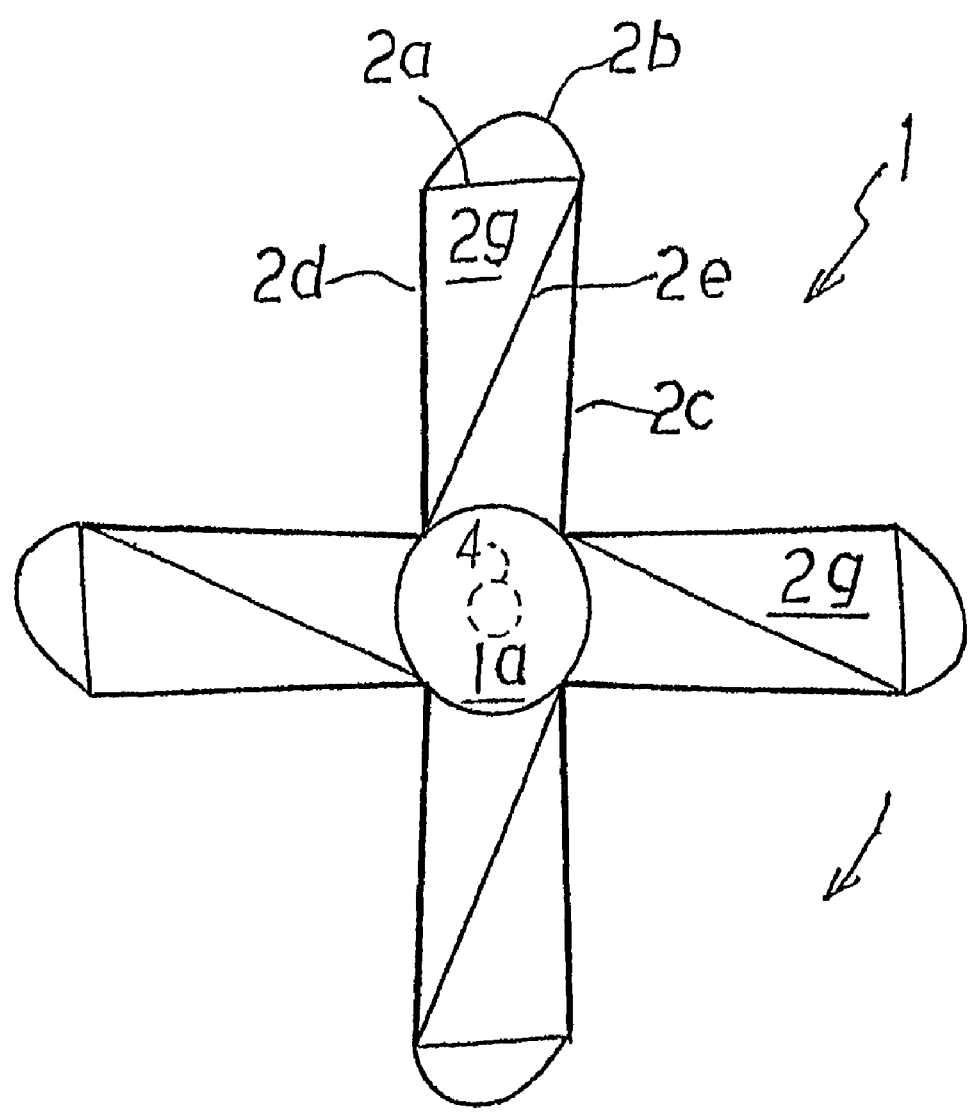
FIG. 11 is a front elevational view of the sixth embodiment of a quiet propeller according to the present invention.

FIG. 11 is a front elevational view of the sixth embodiment according to the present invention. The propeller 1 on the boss 1a rotates around the shaft 4. In this embodiment, the rear surface in FIG. 1 is shown in front view. The left side of a diagonal line 2e tilts downward and the propeller is used as a windmill.

A tilted front surface 2g is formed between a diagonal line 2e and a trailing edge 2d, and has an angle with respect to oncoming fluid flow. Wind is received by the tilted front surface 2g of the blade 2, so that the blade 2 rotates.

The flat part of the blade 2 close to a boss of the propeller 1 is wider, but wind diffuses centrifugally with rotation, so that wind load on the flat part of the blade 2 does not resist rotation.

Wind flow which diffuses centrifugally of the blade 2 is blocked by a tilted end portion 2b and gathered into the tilted front surface 2g with the angle with respect to the oncoming wind flow thereby increasing pressure and rotational force exerted on the propeller 1.

The tilted front surface 2g is tilted rearward at the trailing edge 2d. Oncoming wind which flows along the tilted front surface 2g increases in speed, and decreases in air density or pressure than surrounding air, thereby gathering onto the tilted front surface and improving rotational force.

With the rotation, wind which flows along a bend line 2a rearward pushes the blade 2. The bend line 2a is close to the periphery of the propeller 1 providing high torque. Rotational resistance and noise are low. Therefore, the propeller is suitable for a wind mill for generating electric power and a waterwheel.

Embodiment 7

Figure 12:
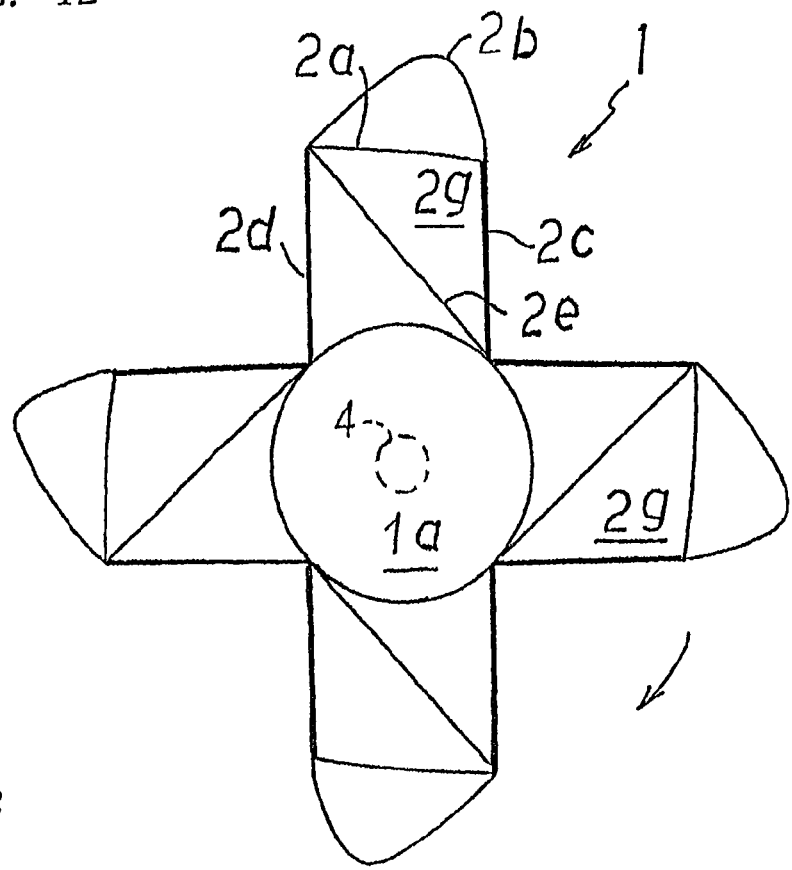
FIG. 12 is a front elevational view of the seventh embodiment of a quiet propeller according to the present invention.

FIG. 12 is a front elevational view of the seventh embodiment of a propeller according to the present invention. The same numerals are allotted to the same members, and description thereof is omitted. The propeller 1 rotates around the shaft 4. The seventh embodiment has a front elevational view corresponding to the rear surface of FIG. 3. A tilted front surface 2g is tilted between a diagonal line 2e and a leading edge 2c such that the leading edge 2c projects forward, and the propeller is used as windmill.

Oncoming wind is received by the tilted front surface 2g with an angle with respect to the oncoming wind and a blade 2 rotates clockwise as shown by an arrow in FIG. 12.

A flat part of the blade 2 is wider close to the boss 1a of the propeller 1, but with rotation, wind flowing onto the part diffuses centrifugally and, thus, does not resist the rotation of the blade 2.

With the rotation, wind which diffuses centrifugally from the blade 2 is blocked by a tilted end portion 2b and gathered into a tilted front surface 2g having an angle with respect to oncoming wind, thereby increasing rotational force exerted on the propeller 1.

The tilted front surface 2g is tilted such that the leading edge 2c projects forward from the diagonal line 2e. Oncoming wind increases in air density over the tilted front surface 2g to push the blade 2 clockwise.

With the rotation of the blade 2, air goes toward the distal end of the diagonal line 2e to push the blade 2 clockwise. The bend line 2a is away from the center of the propeller 1 to provide high torque. Low rotational resistance causes low noise and the blade is suitable as a windmill for a wind power generator and a waterwheel.

This invention is not limited to the embodiments and may vary depending on its use. The bend line 2a and the diagonal line 2e need not be a corner, but may be a gentle slope. The circumferential part of the blade 2 may be wider than the central part.

Figure 13:
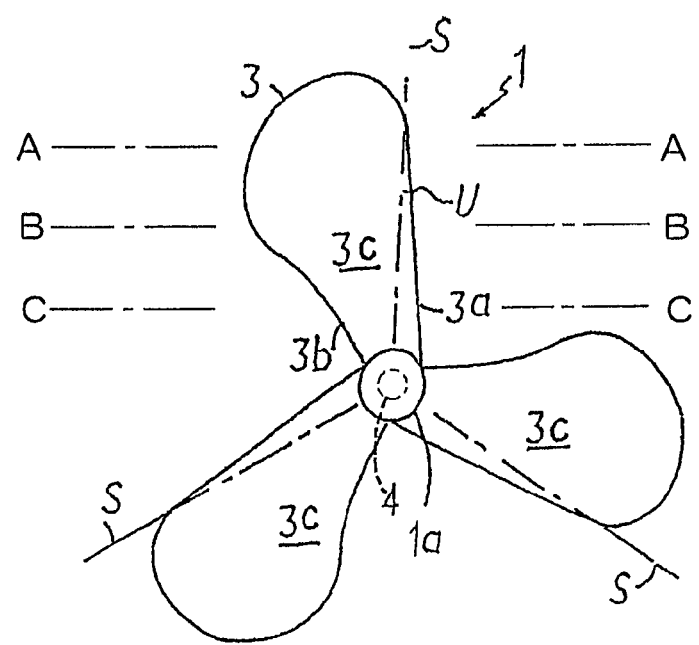
FIG. 13 is a rear elevational view of the eighth embodiment of a quiet propeller according to the present invention.
Figure 14:
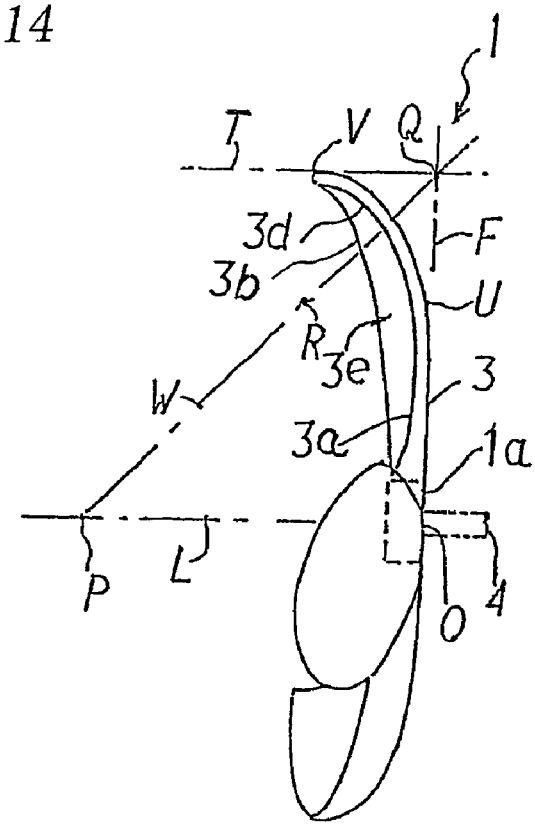
FIG. 14 is a side view thereof.

FIG. 13 is a rear elevational view of the eighth embodiment of a fluid-collecting propeller and FIG. 14 is a side view.

In a small propeller 1, a plurality of blades 3 extends from a boss 1a at regular intervals around a propeller shaft 4.

The propeller 1 is constructed such that the boss 1a and the blade 3 are integrally molded together. If required, the boss 1a and blade 3 may be separately molded and joined together.

The propeller 1 may be made of metal or by plastic molding. In plastic molding, the shaft 4 is made of metal and the blade 3 is made of plastic. They are combined together.

In FIG. 13, S denotes a basic radial line. At the boss 1a, a distance between a leading edge 3a and the basic radial line S is equal to that between the basic radial line S and a trailing edge 3b.

At the periphery of the blade 3, a distance between the trailing edge 3b and the basic radial line S is much wider than that between the radial line S and the leading edge 3a to form broader surface 3c.

The maximum chord length of the flowing surface is set to about 50% of a radius of the propeller 1, but is not limited thereto. The total area of the rear surface of the blade 3 may preferably be less than a half of the area of a circle with the radius of rotation of the blade 3.

In FIG. 14, the leading edge 3a of the blade 3 extends along the front end line F by a half of the radius from the center of the propeller 1, and the remaining of the leading edge 3a is a curved portion 3d.

In FIG. 14, an axis L is at right angles to the front end line F. An end line T is in parallel with the axis L, and the distance P-O is equal to the radius O-Q.

The distance V-Q is a depth of the propeller 1. The distance U-Q is equal to the distance V-Q. A diagonal line W between P and Q crosses a line parallel to the front end line F and passing through V at a point R and also crosses a line passing through U. The curved portion 3d is an arc of a circle around the point R. Depending on the rotational radius of the blade 3 or depth of the blade 3, the curved portion 3d is variable in size. If the distance P-O is longer than the distance O-Q, the arc surface of the curved portion 3d varies. The arc may be part of an ellipse.

The curved portion 3d prevents fluid from diffusing during rotation. The arc of the curved portion 3d may be part of a circle or ellipse, but an arc line G of 10% may be an angle close to the end line T.

Figure 15:
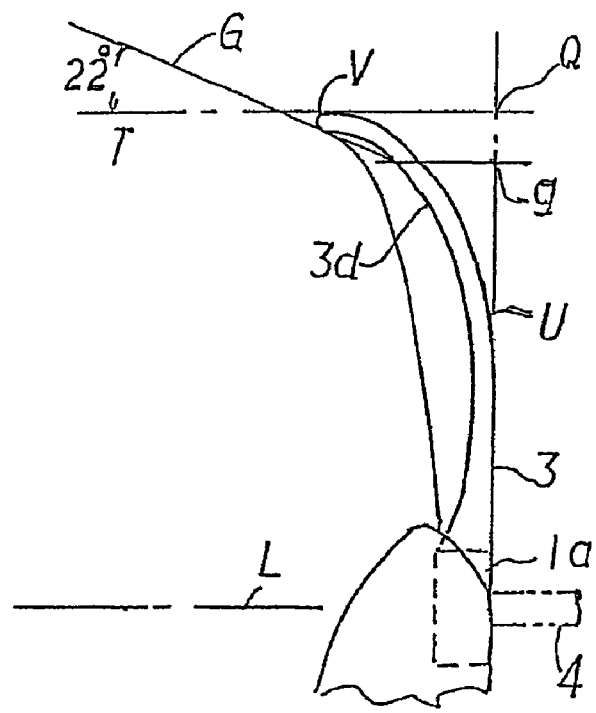
FIG. 15 is a side view of a propeller blade.

For example, in FIG. 15, the distance Q-G is 10% of the distance O-Q or rotational radius. The 10% arc line G is tilted at about 22 degrees with respect to the end line T. The end of the curved portion 3d is nearly in parallel with the end line T, so that fluid which flows centrifugally is blocked by the curved portion 3d and directed to the center of the propeller 1.

Figure 16:
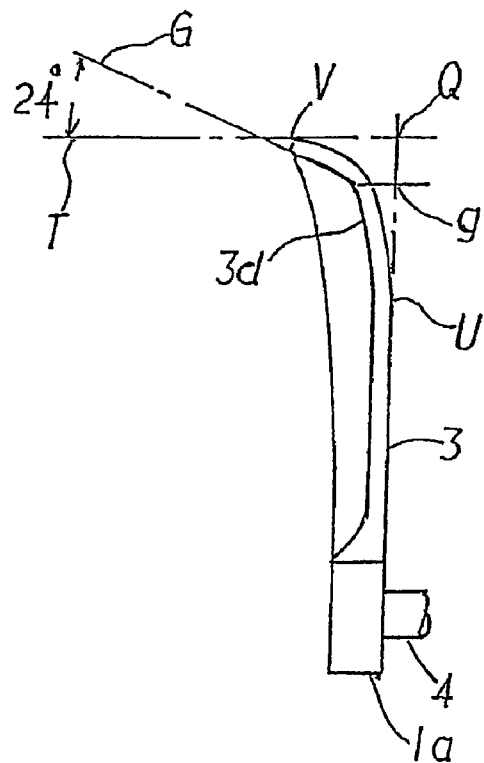
FIG. 16 is a side view of a propeller blade.
Figure 17:
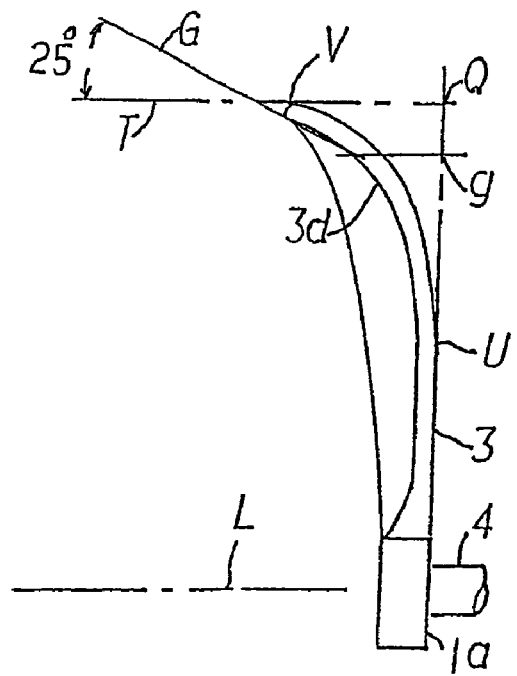
FIG. 17 is a side view of a propeller blade.
Figure 18:
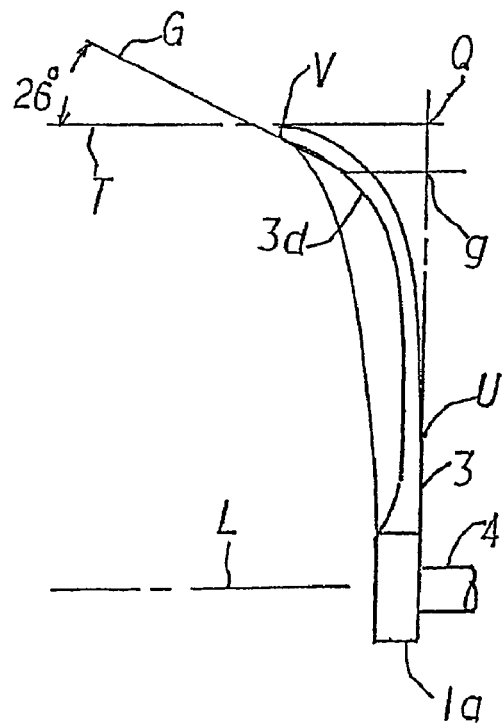
FIG. 18 is a side view of a propeller blade.

In FIG. 16, the depth of a curved portion 3d is smaller. In FIGS. 17 and 18, the distance Q-U is larger than the distance V-Q. When the curved portion 3d is part of a circle, an angle of the arc line G with respect to the end line T can be made smaller.

Figure 19:
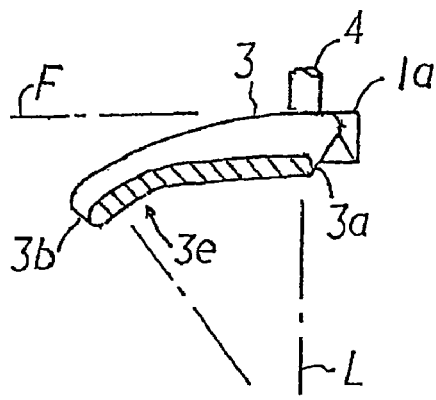
FIG. 19 is a sectional view taken along the line A-A in FIG. 13.
Figure 20:
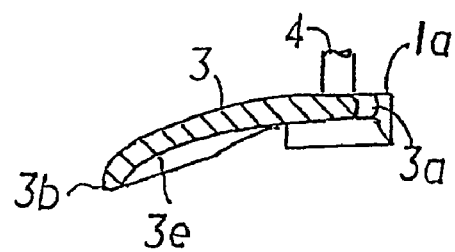
FIG. 20 is a sectional view taken along the line B-B in FIG. 13.

FIG. 19 is a sectional view taken along the line A-A in FIG. 13; FIG. 20 is a sectional view taken along the line B-B: and FIG. 21 is a sectional view taken along the line C-C.

Figure 21:
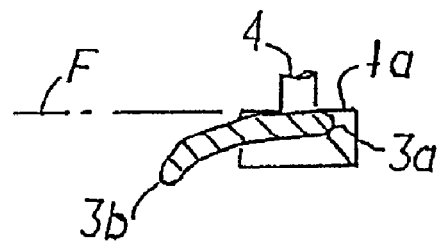
FIG. 21 is a sectional view taken along the line C-C in FIG. 13.

As shown in FIG. 21, the bottom of the leading edge 3a decreases in thickness, while the bottom of the trailing edge 3b is curved downward.

In FIG. 19, the leading edge 3a extends along the front end line F. The trailing edge 3b is away from the line F and the tilted surface 3e is formed.

The tilted surface 3e changes a direction of fluid and is tilted at 30-50 degrees with respect to the axis L.

Therefore, when the propeller 1 rotates clockwise in FIG. 13, fluid which comes across the leading edge 3a is directed into the center of the propeller 1 by the tilted surface 3e in FIG. 19.

Figure 22:
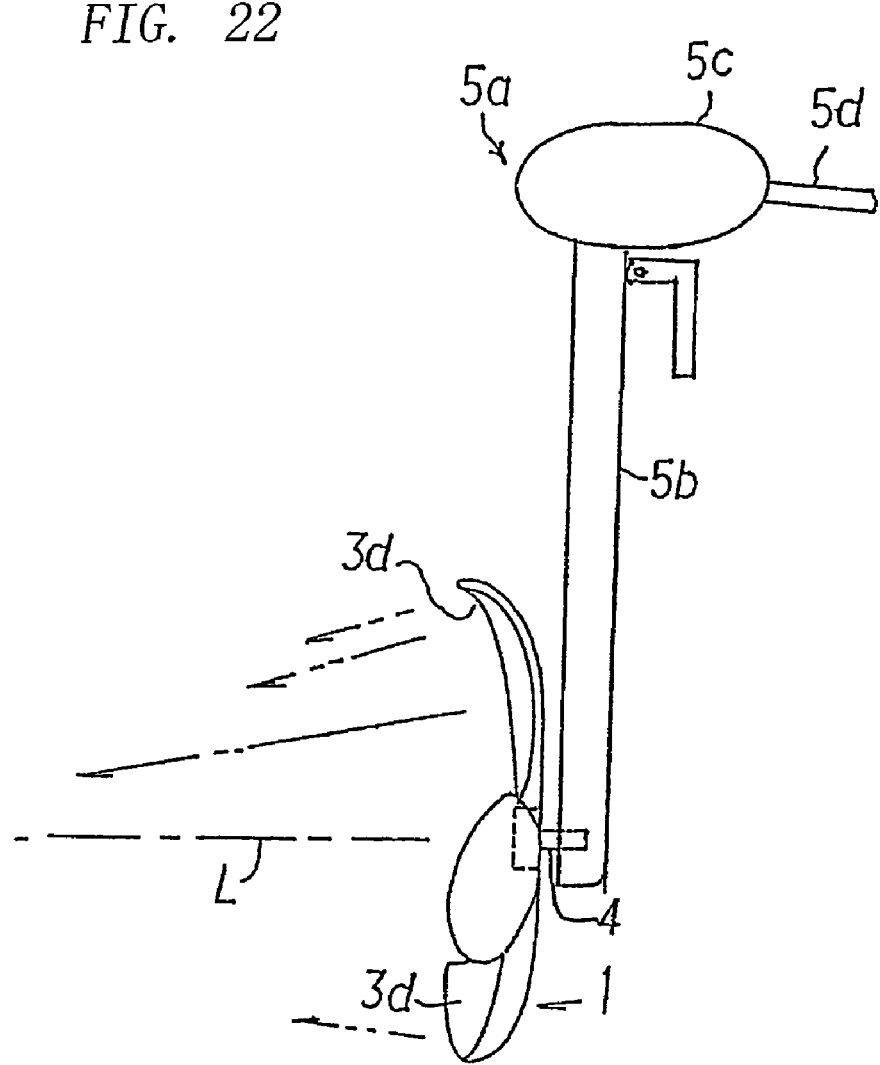
FIG. 22 is a side view of a quiet propeller used as a screw propeller.

FIG. 22 is a side view in which the propeller 1 is used as a screw propeller 5a for a motorboat. The numeral 5b denotes a motorboat, 5c denotes an engine, and 5d denotes a handle. When the propeller 1 rotates, water flows centripetally. Conventionally, water diffuses centrifugally. But in this invention, the curved portion 3d is formed near the periphery and water is surrounded by the curved portion 3d and flows centripetally.

Water passing across the leading edge 3a is directed by the tilted surface 3e centripetally, strongly pushed out through behind the propeller 1 and gathered like a cone.

The closer water gets to the vertex of the cone, the higher water pressure becomes. Thus, a greater thrust can be produced than in a water-diffusing propeller. A lower displacement of the engine can realize a smaller size to allow the engine to provide higher performance.

The propeller does not produce noise caused by stirring water because water surrounded by the tilted portion 3d is pushed outward within a cone-shaped envelope. In a conventional screw propeller, water which diffuses centrifugally collides with water which flows back. The propeller 1 is suitable in use for a submarine requiring soft sounds.

Even if the propeller blade 3 is half above the water, the rotation speed of the propeller 1 will rise, so that the motorboat will run faster. A conventional screw propeller is affected by air, but the propeller of this invention is not affected.

Embodiment 9

Figure 23:
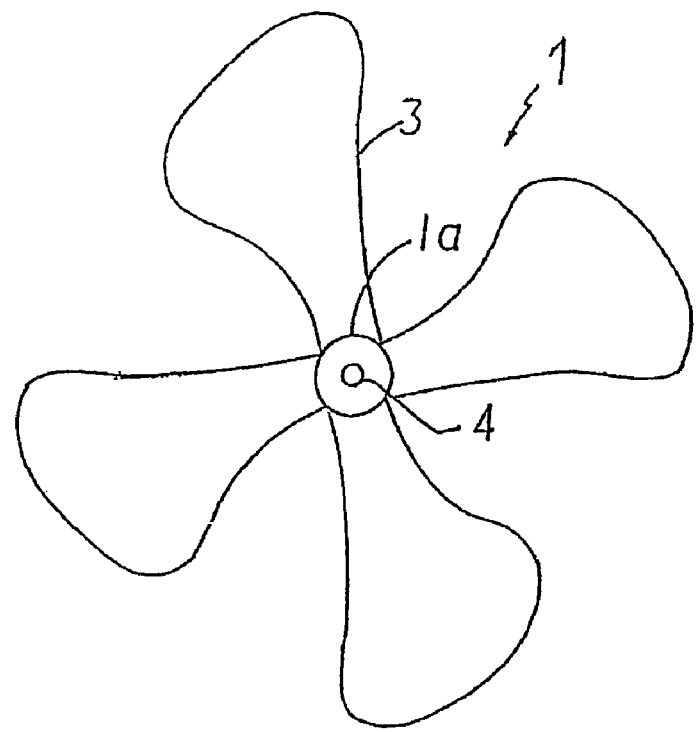
FIG. 23 is a rear elevational view of the ninth embodiment.
Figure 24:
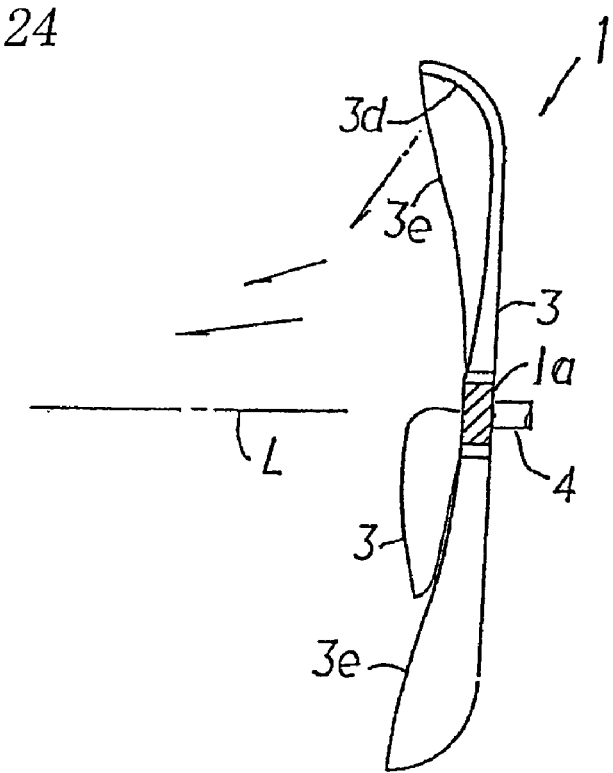
FIG. 24 is a side view of the quiet propeller in FIG. 13.

FIG. 23 is a rear elevational view of the ninth embodiment of a propeller according to the present invention, and FIG. 24 is a side view. The same numerals are allotted to the same elements, and description thereof is omitted.

In the ninth embodiment, four propeller blades 3 are provided. Tests show that three blades are more efficient than four blades for a screw propeller because of water resistance. But with an engine torque, four blades will be preferable.

In the ninth embodiment, a tilted surface 3e is set to be longer horizontally so stronger flow comes centripetally. A tilted portion 3d is narrower than that in FIG. 13 to allow the tilted surface 3e to become gentler.

Figure 25:
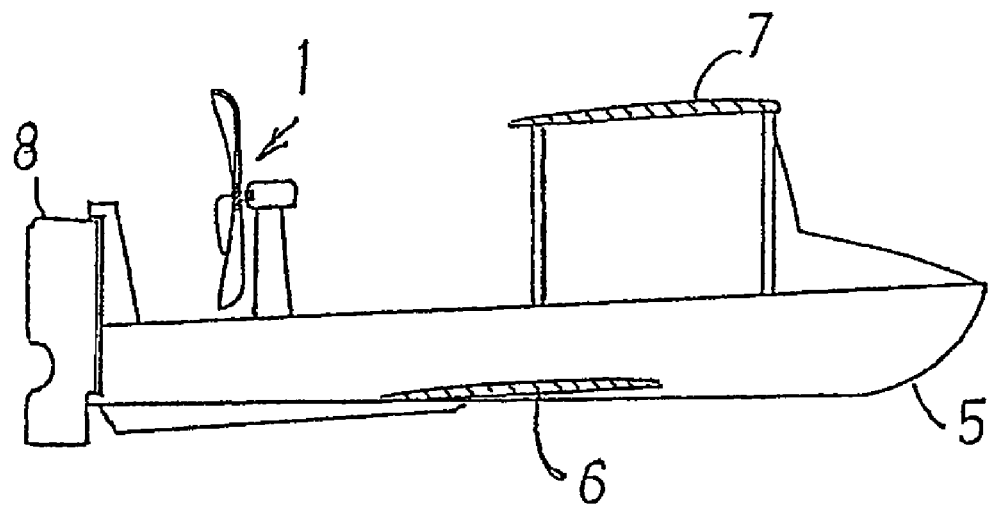
FIG. 25 is a side view of a boat including a propeller according to the present invention.

In FIG. 25, the propeller 1 in the ninth embodiment is employed as an air thrust machine. The numeral 5 denotes a boat; 6 denotes an underwater blade; 7 denotes a lifting blade; and 8 denotes a rudder.

When the propeller 1 rotates, wind does not diffuse, but is strongly pushed back in a cone shape as straight airflow to achieve higher thrust in FIG. 24.

The rudder 8 for the boat 5 in FIG. 25 is amphibious. Wind which is pushed out of the propeller 1 is concentrated, thereby providing excellent control in the rudder 8.

When the boat 5 runs, the boat 5 rises to the surface with the underwater blade 6 and the lifting blade 7. Water resistance under the boat becomes smaller to speed up the boat. The higher engine for the propeller 1 can fly above the water.

Figure 26:
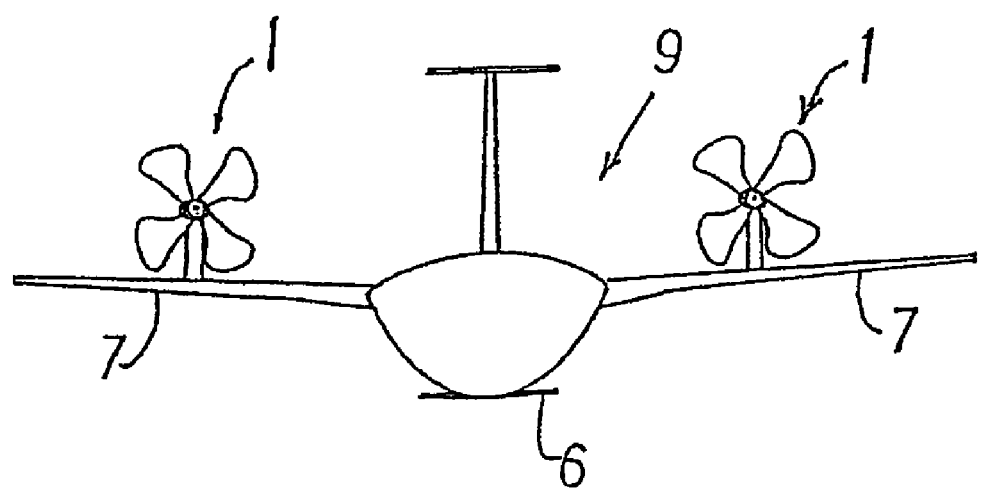
FIG. 26 is a front view of a flying boat including a propeller according to the present invention.

FIG. 26 is a front elevational view where the propeller 1 is employed for a flying boat. A small engine enables sliding over the water, and a higher torque engine enables flying through the air. The propeller 1 is used for leisure, marine farm transportation and island interconnection.

This invention is not limited to the foregoing embodiments, but varies depending on its use.

The propeller does not diffuse fluid, but gathers it centripetally. It is used as a screw propeller and an air thrust machine.

What is claimed is:

1. A quiet propeller driven by a motor, comprising:
a boss at a center of the propeller; and
a plurality of blades extending from the boss, each of said plurality of blades having a leading edge with respect to a direction of rotation of said plurality of blades and a trailing edge with respect to said direction of rotation of said plurality of blades, a first portion of a back surface of the blade rising centrifugally toward a distal end of the blade from a bend line connecting a distal end of the leading edge to a distal end of the trailing edge, a diagonal line extending from an intersection of the leading edge with the bend line to a proximal end of the trailing edge, a first angle of the back surface of the blade close to the boss with respect to oncoming fluid flow being defined from 0 to four degrees, the leading edge being gradually thinner from the boss to a distal end of the blade, a second portion of the back surface of the blade rising toward the trailing edge between the diagonal line and the trailing edge, a front surface of the blade being planar between the leading edge and the trailing edge, a second angle of the back surface of the blade away from the boss with respect to the oncoming fluid flow ranging from 7 to 25 degrees, whereby fluid from the leading edge is gathered centripetally of the propeller by the tilted portion and the tilted back surface during rotation of the propeller.

2. The quiet propeller of claim 1 wherein the first angle of the back surface of the blade is 0 degrees.

3. A quiet propeller driven by a motor, comprising:
a boss at a center of the propeller; and
a plurality of blades extending from the boss, each of said plurality of blades having a leading edge with respect to a direction of rotation of said plurality of blades and a trailing edge with respect to said direction of rotation of said plurality of blades, a first portion of a back surface of the blade rising centrifugally toward a distal end of the blade from a bend line connecting a distal end of the leading edge to a distal end of the trailing edge, a diagonal line extending from an intersection of the leading edge with the bend line to a proximal end of the trailing edge, a first angle of the back surface of the blade close to the boss with respect to oncoming fluid flow being defined from 0 to four degrees, a second portion of the back surface of the blade rising from the diagonal line to the trailing edge, a front surface of the blade being planar between the leading edge and the trailing edge, a second angle of the back surface of the blade away from the boss with respect to the oncoming fluid flow ranging from 7 to 25 degrees, whereby fluid from the leading edge is gathered centripetally of the propeller by the tilted portion and the tilted back surface during rotation of the propeller.

4. The quiet propeller of claim 3 wherein the first angle of the back surface of the blade is 0 degrees.

5. A quiet propeller driven by a motor, comprising:
a boss at a center of the propeller; and
a plurality of blades extending from the boss, each of said plurality of blades having a leading edge with respect to a direction of rotation of said plurality of blades and a trailing edge with respect to said direction of rotation of said plurality of blades, a first portion of a back surface of the blade rising centrifugally toward a distal end of the blade from a bend line connecting a distal end of the leading edge to a distal end of the trailing edge, a diagonal line extending from an intersection of the trailing edge with the bend line to a proximal end of the leading edge, a first angle of the back surface of the blade close to the boss with respect to oncoming fluid flow being defined from 0 to four degrees, a second portion of the back surface of the blade rising from the diagonal line to the leading edge, a front surface of the blade being planar between the leading edge and the trailing edge, a second angle of the back surface of the blade away from the boss with respect to the oncoming fluid flow ranging from 7 to 25 degrees, whereby fluid from the leading edge is gathered centripetally of the propeller by the tilted portion and the tilted back surface during rotation of the propeller.

6. The quiet propeller of claim 5 wherein the first angle of the back surface of the blade is 0 degrees.

\* \* \* \* \*

UNITED STATES PATENT AND TRADEMARK OFFICE
CERTIFICATE OF CORRECTION

PATENT NO.       : 8,371,819 B2                                                      Page 1 of 1
APPLICATION NO.  : 12/092114
DATED            : February 12, 2013
INVENTOR(S)      : Masahiko Suzuki It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1200 days.

Signed and Sealed this
First Day of September, 2015

Michelle K. Lee
*Director of the United States Patent and Trademark Office*